United States Patent Office 3,336,319
Patented Aug. 15, 1967

3,336,319
PIPERIDIDES OF DIMER ACIDS
Evald L. Skau, Robert R. Mod, and Frank C. Magne, New Orleans, La., assignors to the United States of America as represented by the Secretary of Agriculture
No Drawing. Application Apr. 2, 1964, Ser. No. 361,925, now Patent No. 3,248,396, which is a division of application Ser. No. 260,923, Feb. 25, 1963, now Patent No. 3,219,612. Divided and this application Sept. 10, 1965, Ser. No. 509,452
1 Claim. (Cl. 260—294)

This application is a division of Ser. No. 361,925, filed Apr. 2, 1964, now United States Patent No. 3,248,396, which was a division of Ser. No. 260,923, filed Feb. 25, 1963, now United States Patent No. 3,219,612.

A non-exclusive, irrevocable, royalty-free license in the invention herein described, throughout the world for all purposes of the United States Government, with the power to grant sublicenses for such purposes, is hereby granted to the Government of the United States of America.

This invention relates to certain compounds which are N-acyl derivatives of cyclic imines, to some unique mixtures of N-acyl derivatives of cyclic amines, and to plastic compositions, the plasticizer component of which is at least one of the compounds or one of the unique mixtures that are the subject of this invention. More particularly, the invention relates broadly to N,N-disubstituted long chain aliphatic amides the acyl component of which if saturated is an alkanoic acyl containing from 10 to 18 carbon atoms, and if unsaturated is an alkenoic acyl containing from 18 to 22 carbon atoms, the amide nitrogen in all cases being a member of a heterocyclic ring or in the case of a fused ring system one of the heterocyclic rings, all of the other ring members being carbon or nitrogen atoms.

The invention, in addition, relates to certain other new amide plasticizers wherein the acyl component is derived from dibasic alkanoic acids, from epoxidized alkanoic acids and from dimer acids. This application is concerned specifically with the piperidides of the dimer acids.

We have discovered that the piperidides of the dimer acids are good, compatible, solvent-type plasticizers for vinyl chloride resins. Moreover, these compounds are efficient primary solvent-type plasticizers which can be made from low price fatty acids and which exhibit good compatibility with and impart low volatility loss, resistance to microbial action, excellent low temperature properties, and stability to northern light exposure to polymer and copolymer resins of vinyl chloride.

The terms "vinyl type resin" and "vinyl chloride resin" are used throughout this specification and claim to refer to polymers and copolymers of monomers containing vinyl chloride in a predominant proportion by weight. Terms such as "compatible," "good compatibility," and "compatible plasticizes" in reference to the plasticizers which are the subject of this invention are used throughout the specification to refer to plasticizers that show no sign of exudation, migration to the surface, for at least two weeks when the plasticizers are present in the resin in proportions of about 70 parts by weight of plasticizer to 100 parts by weight of resin.

Not only are the compounds that are the subject of this invention useful as plasticizers for vinyl chloride resins, but they are also efficient, compatible softeners for Buna N rubber, imparting low volatility loss and excellent. low temperature properties to the plasticized rubber compositions.

If a resin is plasticized with a compound with which it has only limited compatibility, the plasticizer soon exudes or migrates to the surface unless the plasticizer is used either in a limited amount or is used in conjunction with a mutual solvent (a compatble auxiliary plasticizer) to obtain adequate compatibility.

It is known in the art that compounds similar to those which are the subject of this invention exhibit reasonably good compatibility for hydrophyllic type resins but in order to obtain adequate flexibility must be employed together with a secondary or an auxiliary plasticizer. See for example United States Patent Number 2,339,056.

It would be expected from the recognized compatibility of compounds related to the type herein described with polyvinyl acetals (hydrophyllic type resins), that these compounds would be quite incompatible with polymers of the vinyl chloride type. We have discovered, however, that not only are the particular compounds herein described compatible as primary plasticizers with vinyl chloride resins but as we note above they are compatible with the hydrophyllic type resins as well.

The terms "dimer acid," or "dimerized acids" are used interchangeably herein to refer to acids or mixtures of acids consisting essentially of dibasic acids containing from 32 to 44 carbon atoms resulting from the polymerization or dimerization of long chain $C_{16}$ to $C_{22}$ unsaturated fatty acids. Production of these acids and use of the term are disclosed, for example, in United States Patents Nos. 2,384,443, 2,435,478, 2,450,940, and 2,477,116. Patents Nos. 2,435,478 and 2,477,116, in particular, define the terms.

The compounds that are the subject of this invention are conveniently prepared by reacting piperidine with the dimer acids or corresponding acid chlorides. In any event, methods for preparing compounds such as those herein described are well known to those skilled in the art of fatty acid chemistry. The details of the preparations are set forth in the operating examples which follow:

EXAMPLE 1

*N-oleoyl-2-methylpiperidine.*—A mixture of 31.6 grams (0.32 mole) of 2-methylpiperidine, 60 grams (0.21 mole) of oleic acid, and 20 milliliters of benzene was refluxed in an apparatus equipped with a Dean-Stark trap until the evolution of water ceased. The reaction mixture was diluted with 150 milliliters of commercial hexane, washed successively with dilute hydrochloric acid and water, and dried over anhydrous sodium sulfate. Free acid was removed by percolating the hexane solution through a column of activated alumina, and eluting the amide with a 1:1 hexane-ethanol mixture. The solvent was removed by stripping under reduced pressure. Analysis of the product, N-oleoyl - 2 - methylpiperidine: Percent C, 78.87 (theory 79.20); percent H, 12.13 (theory 12.47); percent N, 3.86 (theory 3.85).

EXAMPLE 2

*Piperidide of dimer acid* (Empol 1014).—The piperidide of dimer acid was prepared by the procedure of Example 1 from 18.3 grams (0.22 mole) of piperidine and 40 grams (0.07 mole) of dimer acid (Empol 1014). The product, the piperidide of dimer acid, had a nitrogen content of 3.98%.

We claim:

Piperidide of dimerized long chain $C_{16}$ to $C_{22}$ unsaturated fatty acids.

References Cited

UNITED STATES PATENTS 2,058,013  10/1936  Henke et al. _____ 260—294

OTHER REFERENCES

Cowan et al.: Oil and Soap, vol. 21 (1944), p. 101.
Merck Index, p. 610, 7th Edition, Merck Corp. (1960).

WALTER A. MODANCE, *Primary Examiner.*

A. D. SPEVACK, *Assistant Examiner.*